US011122665B1

(12) United States Patent
He

(10) Patent No.: US 11,122,665 B1
(45) Date of Patent: Sep. 14, 2021

(54) PROTECTIVE DEVICE AND METHOD OF LIGHTING ASSEMBLY, LIGHTING ASSEMBLY AND PROTECTIVE METHOD THEREOF

(71) Applicant: Shaanxi Wasentech Intelligent Electric Co., Ltd., Xi'an High-tech Zone (CN)

(72) Inventor: Dengfeng He, Xi'an High-tech Zone (CN)

(73) Assignee: Shaanxi Wasentech Intelligent Electric Co., Ltd., Xi'an High-tech Zone (CN)

( * ) Notice: Subject to any disclaimer, the term of this patent is extended or adjusted under 35 U.S.C. 154(b) by 0 days.

(21) Appl. No.: 17/032,095

(22) Filed: Sep. 25, 2020

(51) Int. Cl.
  *H05B 45/50* (2020.01)
  *F21K 9/278* (2016.01)
  *F21V 23/00* (2015.01)
  *F21Y 115/10* (2016.01)

(52) U.S. Cl.
  CPC ............ *H05B 45/50* (2020.01); *F21K 9/278* (2016.08); *F21V 23/003* (2013.01); *F21Y 2115/10* (2016.08)

(58) Field of Classification Search
  None
  See application file for complete search history.

(56) References Cited

U.S. PATENT DOCUMENTS

| 2011/0260614 A1* | 10/2011 | Hartikka | H05B 45/50 315/51 |
| 2012/0299494 A1* | 11/2012 | Hartikka | H05B 45/00 315/201 |
| 2017/0184294 A1* | 6/2017 | Tao | F21V 25/04 |

* cited by examiner

*Primary Examiner* — Anh Q Tran
(74) *Attorney, Agent, or Firm* — Michael J. Feigin, Esq.; Feigin and Fridman LLC

(57) ABSTRACT

Disclosed is a protective device of a lighting assembly, the lighting assembly comprising at least one LED, a first end lamp base and a second end lamp base, and the protective device including a first detecting module and a second detecting module and a driving module. The first detecting module and the second detecting are configured to detect a connection state of the first end lamp base to output a first detecting signal, and a connection state of the second end lamp base to output a second detecting signal. The driving module is connected to the at least one LED and configured to control the at least one LED to work based on the first detecting signal and the second detecting signal. The present disclosure also discloses a lighting assembly including the protective device and a protective method of the lighting assembly.

12 Claims, 4 Drawing Sheets

PROTECTIVE DEVICE AND METHOD OF LIGHTING ASSEMBLY, LIGHTING ASSEMBLY AND PROTECTIVE METHOD THEREOF

TECHNICAL FIELD

The present disclosure generally relates to the field of lighting assembly, and in particular to a protective device of a lighting assembly, the lighting assembly and a protective method thereof.

BACKGROUND

Light-emitting diode (LED) light source has received extensive attention and has been widely used due to its small size, low power consumption and long service life.

The power of LED lighting assembly with two ends lamp base is supplied by power supply equipment (for example, ballast or city power directly) in a stable state. After power-on, the AC signal will be supplied to the LED within the lamp tube through the lamp base. If one end of the lamp base is not installed properly, there is a risk of leakage of the lamp base, which may not only damage the internal circuit in the lamp tube, but also may cause safety accidents such as smoke and fire due to the arc, and may even cause the risk of electric shock to the installer.

SUMMARY

The protective device of the lighting assembly provided by the present disclosure may turn off the lamp tube when the lamp tube is installed incorrectly (for example, the lamp base is not installed properly), so that the LED may not work, therefore on one hand, it may provide safety protection for installer and prevent electric shock, on the other hand, it may also provide protection to other devices or circuits in the lamp tube, thereby preventing the lamp base from arcing.

One aspect of the present disclosure is to provide a protective device of a lighting assembly, the lighting assembly comprises at least one LED, a first end lamp base and a second end lamp base. The protective device comprises a first detecting module and a second detecting module and a driving module. The first detecting module and the second detecting module are configured to detect a connection state of the first end lamp base to output a first detecting signal, and a connection state of the second end lamp base to output a second detecting signal. The driving module is connected to the at least one LED and configured to control the at least one LED to work based on the first detecting signal and the second detecting signal.

Specifically, the first end lamp base comprises a first pin and a second pin, and the first detecting module includes a first capacitor connected with the first pin and the second pin to detect whether there is AC signal through the first capacitor.

Specifically, in response to there being no AC signal through the first capacitor, the first end lamp base is in disconnected state and the first detecting signal is low level, in response to there being AC signal through the first capacitor, the first end lamp base is in conductive state and the first detecting signal is high level or pulse.

Specifically, the second end lamp base includes a third pin and a fourth pin, and the second detecting module includes a second capacitor connected with the third pin and the fourth pin to detect whether there is AC signal through the second capacitor.

Specifically, in response to there being no AC signal through the second capacitor, the second end lamp base is in disconnected state and the second detecting signal is low level, in response to there being AC signal through the second capacitor, the second end lamp base is in conductive state and the second detecting signal is high level or pulse.

Specifically, the driving module includes a control switch, and the control switch is turned on or turned off to control the at least one LED to work or not.

Specifically, the driving module further includes a trigger circuit, the trigger circuit is connected to the control switch to control turning on or turning off the control switch based on a control signal generated by the first detecting signal and the second detecting signal.

Specifically, in response to the first detecting signal and the second detecting signal being both high levels or pulses, the control switch is turned on to control the at least one LED to work, and in response to at least one of the first detecting signal and the second detecting signal being low level, the control switch is turned off to control the at least one LED not to work.

Specifically, the trigger circuit includes a first switch, a second switch and a third switch, a first terminal of the first switch is configured to receive the first detecting signal, a first terminal of the second switch is configured to receive the second detecting signal, a first terminal of the third switch is connected to a second terminal of the first switch and a second terminal of the second switch, and a second terminal of the third switch is connected to a driving end of the control switch.

Specifically, in response to the first detecting signal and the second detecting signal being both high levels or pulses, the first switch and the second switch are turned on, the third switch is turned off, and the control switch is turned on.

Specifically, in response to at least one of the first detecting signal and the second detecting signal being low level, at least one of the first switch and the second switch is turned off, the third switch is turned on, and the control switch is turned off.

Specifically, the driving module further includes a delay circuit configured to turn on the control switch within a preset time after power-on.

Specifically, in response to at least one of the first detecting signal and the second detecting signal being low level, the delay circuit is reset.

Specifically, the protective device further includes a rectifying module connected between the at least one LED and the first end lamp base and the second end lamp base to convert alternating current to direct current to provide to the at least one LED.

Another aspect of the present disclosure is to provide a lighting assembly including the above protective device.

Another aspect of the present disclosure is to provide a protective method of a lighting assembly. The lighting assembly includes at least one LED, a first end lamp base and a second end lamp base. The protective method includes detecting a connection state of the first end lamp base and the second end lamp base to output a first detecting signal and a second detecting signal, and controlling the at least one LED to work based on the first detecting signal and the second detecting signal.

These and other features and aspects will be better understood with reference to the following description, drawings and claims.

BRIEF DESCRIPTION OF DRAWINGS

The present disclosure will be better understood when the following detailed description is read with reference to the accompanying drawings, in which.

DETAILED DESCRIPTION OF EMBODIMENTS

Hereafter, a detailed description will be given for preferred embodiments of the present disclosure. It should be pointed out that in the detailed description of the embodiments, for simplicity and conciseness, it is impossible for the Description to describe all the features of the practical embodiments in details. It should be understood that in the process of a practical implementation of any embodiment, just as in the process of an engineering project or a designing project, in order to achieve a specific goal of the developer and in order to satisfy some system-related or business-related constraints, a variety of decisions will usually be made, which will also be varied from one embodiment to another. In addition, it may also be understood that although the effort made in such developing process may be complex and time-consuming, some variations such as design, manufacture and production on the basis of the technical contents disclosed in the disclosure are just customary technical means in the art for those of ordinary skilled in the art relating to the contents disclosed in the present disclosure, which should not be regarded as insufficient disclosure of the present disclosure.

Unless otherwise defined, the technical and scientific terms used in the claims and the specification are as they are usually understood by those skilled in the art to which the present disclosure pertains. "First", "second" and similar words used in the specification and the claims do not denote any order, quantity or importance, but are merely intended to distinguish between different constituents. The terms "one", "a" and similar words are not meant to be limiting, but rather denote the presence of at least one. "Comprising", "consisting of" and similar words mean that the elements or articles appearing before "comprising" or "consisting of" include the elements or articles and their equivalent elements appearing behind "comprising" or "consisting of", not excluding any other elements or articles. "Connected", "coupled" and similar words are not restricted to physical or mechanical connections, but may also include electrical connections, whether direct or indirect.

The lighting assembly of the present application includes, but is not limited to, light emitting diode (LED) lamps, organic light emitting diode (OLED) lamps, fluorescent lamps, and high intensity discharge (HID) lamps. The following will take LED lights as an example for detailed description.

Figure 1:
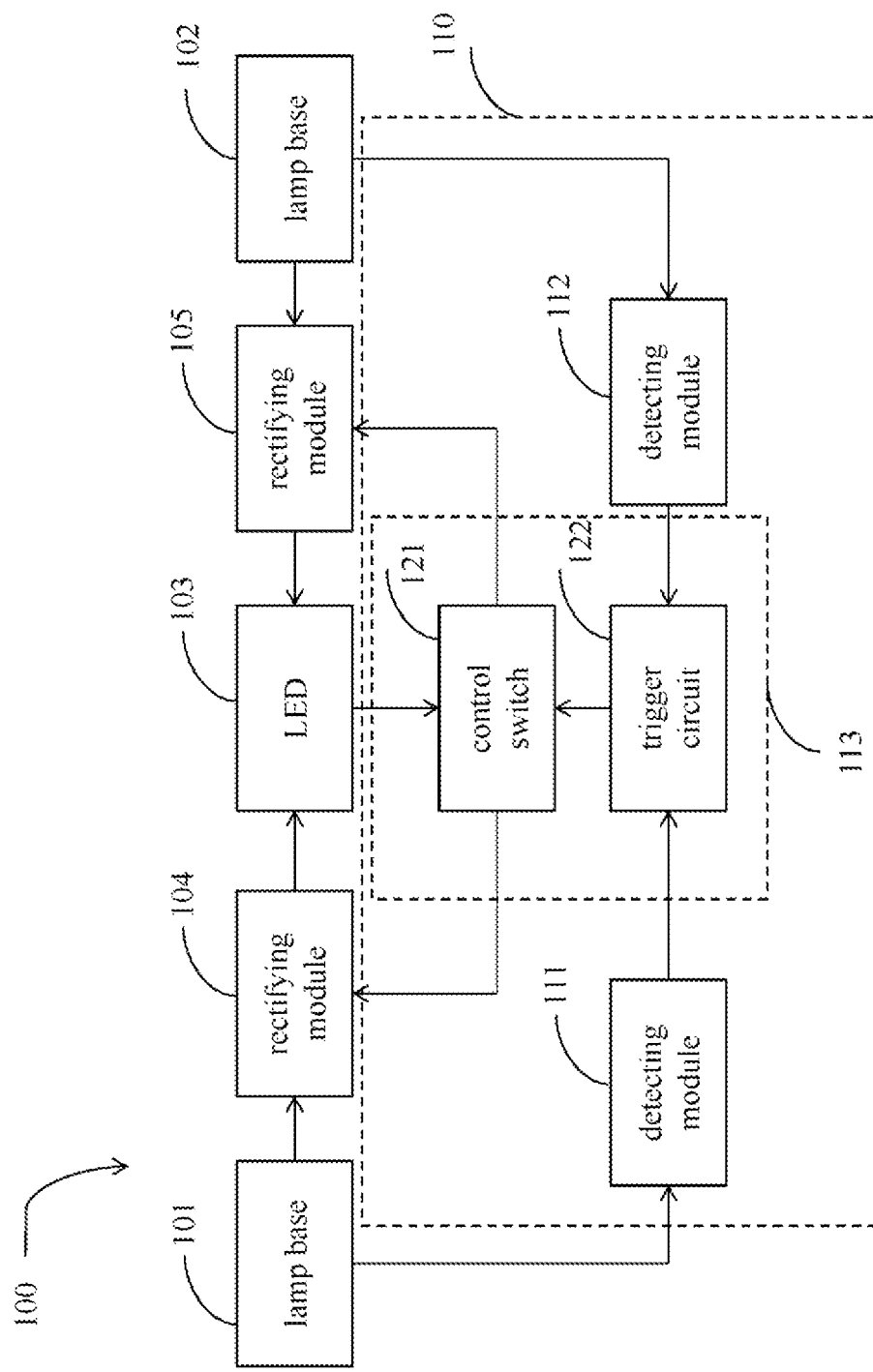
FIG. 1 is a schematic diagram of a lighting assembly according to the embodiments of the present disclosure.
Figure 2:
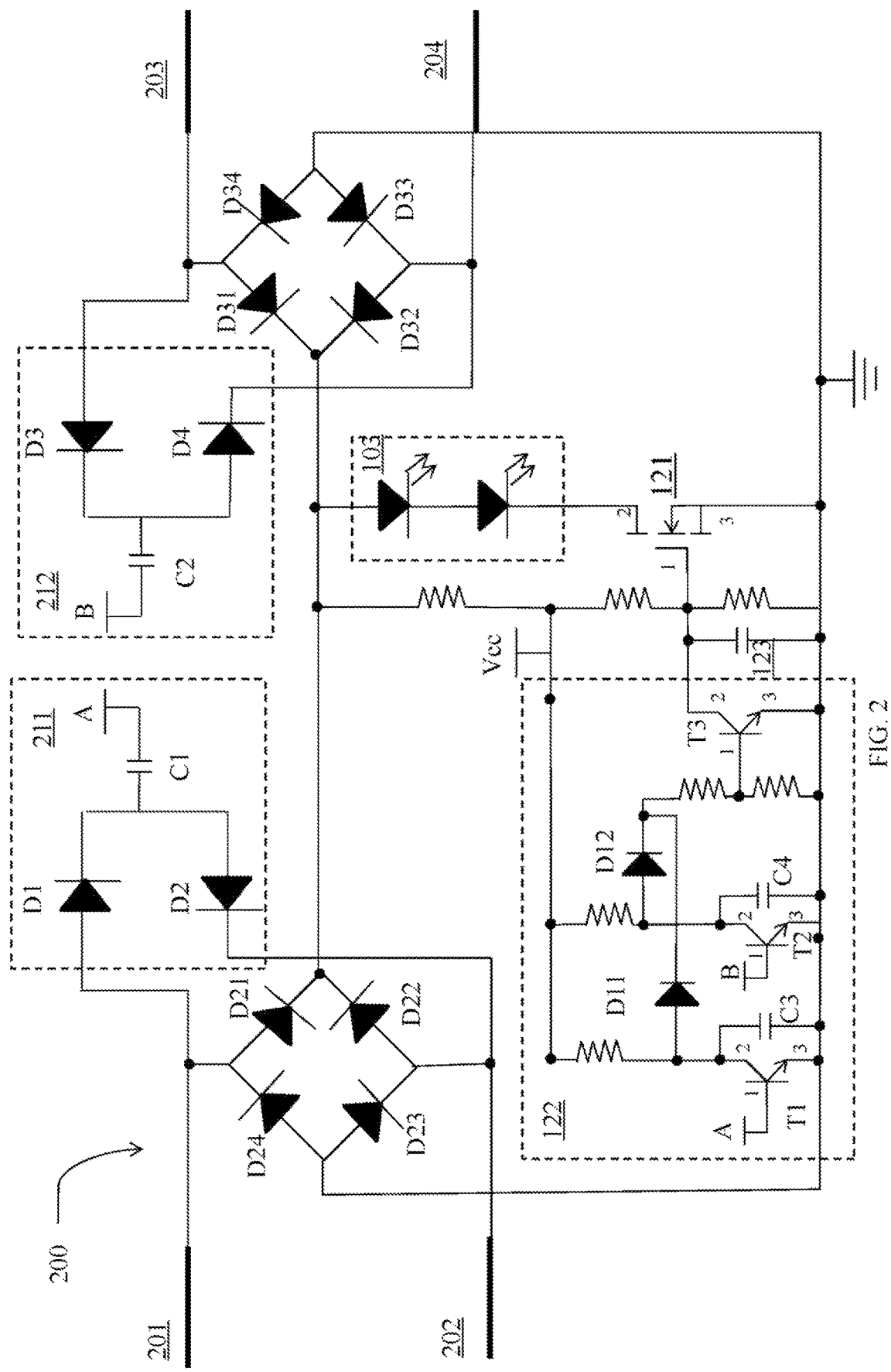
FIG. 2 is a schematic circuit diagram of the lighting assembly according to the embodiments of the present disclosure.

FIG. 1 illustrates a schematic diagram of a lighting assembly according to the embodiments of the present disclosure, FIG. 2 illustrates a schematic circuit diagram of the lighting assembly according to the embodiments of the present disclosure. As shown in FIG. 1 and FIG. 2, the lighting assembly 100 comprises a first end lamp base 101, a second end lamp base 102, at least one LED 103 and a protective device 110, the protective device 110 includes a first detecting module 111, a second detecting module 112 and a driving module 113, the first detecting module 111 and the second detecting module 112 are configured to detect a connection state of the first end lamp base 101 to output a first detecting signal and a connection state of the second end lamp base 102 to output a second detecting signal, and the driving module 113 is connected to the at least one LED 103 and is configured to control the at least one LED 103 to work based on the first detecting signal and the second detecting signal.

The first detecting module 111 is connected to the first end lamp base 101 to detect the connection state of the first end lamp base 101 to output the first detecting signal (A as shown in FIG. 2), the second detecting module 112 is connected to the second end lamp base 102 to detect the connection state of the second end lamp base 102 to output the second detecting signal (B as shown in FIG. 2).

Specifically, the term "connection state" refers to the state of conductive or disconnected electrical connection, wherein the conductive state means that the lamp base is installed properly and there is AC signal through the lamp base, and the disconnected state means that the lamp base is not installed properly and there is no AC signal through the lamp base.

Specifically, the first end lamp base 101 includes a first pin 201 and a second pin 202, and the second end lamp base 102 includes a third pin 203 and a fourth pin 204.

The first detecting module 111 includes a first capacitor C1 connected with the first pin 201 and the second pin 202 to detect whether there is AC signal through the first capacitor C1. When there is no AC signal through the first capacitor C1, the first end lamp base 101 is not installed properly and is in disconnected state, and the first detecting signal is low level. When there is AC signal through the first capacitor C1, the first end lamp base 101 is installed properly and is in conductive state, and the first detecting signal is high level or pulse. Wherein the pulse is a periodic pulse, the frequency of the periodic pulse depends on the natural frequency of the ballast connected to the lamp base and the high level can be obtained by integrating the pulse.

Specifically, the first detecting module 111 includes a first DC blocking circuit 211, in addition to the first capacitor C1, the first DC blocking circuit 211 further includes a diode D1 and a diode D2 connected in series between the first pin 201 and the second pin 202, wherein one terminal of the first capacitor C1 is connected to a connection point between the diode D1 and the diode D2, and the other terminal of the first capacitor C1 is used to output the first detecting signal. Wherein a positive terminal of the diode D1 is connected to the first pin 201, a negative terminal of the diode D1 is connected to a positive terminal of the diode D2, and a negative terminal of the diode D2 is connected to the second pin 202. When the first end lamp base 101 is installed properly, there is AC signal through the first end lamp base 101, that is, there is AC signal through the first capacitor C1, and the first detecting signal output from point A is high level or pulse.

Similarly, the second detecting module 112 includes a second capacitor C2 connected with the third pin 203 and the fourth pin 204 to detect whether there is AC signal through the second capacitor C2. When there is no AC signal through the second capacitor C2, the second end lamp base 102 is not installed properly and is in disconnected state, and the second detecting signal is low level. When there is AC signal through the second capacitor C2, the second end lamp base 102 is installed properly and is in conductive state, and the second detecting signal is high level or pulse.

Specifically, the second detecting module 112 includes a second DC blocking circuit 212, in addition to the second capacitor C2, the second DC blocking circuit 212 further includes a diode D3 and a diode D4 connected in series between the third pin 203 and the fourth pin 204, wherein one terminal of the second capacitor C2 is connected to a connection point between the diode D3 and the diode D4, and the other terminal of the second capacitor C2 is used to output the second detecting signal B. Wherein a positive terminal of the diode D3 is connected to the third pin 203, a negative terminal of the diode D3 is connected to a positive terminal of the diode D4, and a negative terminal of the diode D4 is connected to the fourth pin 204. When the second end lamp base 102 is installed properly, there is AC signal through the second end lamp base 102, that is, there is AC signal through the second capacitor C2, and the second detecting signal output from point B is high level or pulse.

Although the embodiments of the present disclosure disclose detecting the connection states of the first end lamp base and the second end lamp base by using the DC blocking capacitor (i.e. the first capacitor and the second capacitor), those skilled in the art should understand that other methods to detect whether the lamp base forms a path or not may also be used, such as but not limited to detecting the voltage or current signal applied between the two pins of the lamp base, or detecting the voltage or current of the loop, or releasing an electrical signal at one end of the lamp base to detect whether the other end may receive the signal etc.

In some embodiments, the driving module 113 includes a control switch 121, and the control switch 121 is turned on or turned off to control the at least one LED 103 to work or not. Specifically, taking MOSFET as an example, a second terminal (drain electrode) of the control switch 121 is connected to a negative terminal of the at least one LED 103, and a third terminal (source electrode) of the control switch 121 is connected to ground. When the control switch 121 is turned on, the circuit of the at least one LED 103 forms a path, and the at least one LED 103 may work. When the control switch 121 is turned off, the circuit of the at least one LED 103 is open, and the at least one LED 103 may not work.

The control switch 121 may be, for example, Metal Oxide Semiconductor field Effect Transistors (MOSFETs), Bipolar Junction Transistors (BJTs), thyristors, relays, etc., and the control switch 121 may also be LED control devices such as switching power supplies or linear power supplies.

In some embodiments, the driving module 113 further includes a trigger circuit 122, the trigger circuit 122 is connected to the control switch 121 to control (or trigger) turning on or turning off the control switch 121 based on a control signal (or a trigger signal) generated by the first detecting signal and the second detecting signal. Specifically, an output terminal of the trigger circuit 122 is connected to a first terminal (grid electrode) of the control switch 121 to provide the control signal or the trigger signal to the first terminal of the control switch 121.

When the first detecting signal and the second detecting signal are both high level or pulse, the trigger circuit 122 outputs the control signal (high level) to trigger to turn on the control switch 121 to let the at least one LED 103 work. When at least one of the first detecting signal and the second detecting signal is low level, the trigger circuit 122 outputs the control signal (low level) to trigger to turn off the control switch 121 to let the at least one LED 103 not work. The low level herein refers to the low level without a pulse signal, specifically, the low level refers to the low level that lasts for a preset time.

In some embodiments, the trigger circuit 122 includes a first switch T1, a second switch T2 and a third switch T3. A first terminal of the first switch T1 is configured to receive the first detecting signal, a first terminal of the second switch T2 is configured to receive the second detecting signal, a first terminal of the third switch T3 is connected to a second terminal of the first switch T1 and a second terminal of the second switch T2, and a second terminal of the third switch T3 is the output terminal of the trigger circuit 122 and is connected to a driving terminal (i.e. the first terminal or the grid electrode) of the control switch 121. More specifically, a third terminal of the first switch T1, a third terminal of the second switch T2 and a third terminal of the third switch T3 are connected to the ground respectively.

Specifically, the trigger circuit 122 further includes a capacitor C3 connected in parallel with the first switch T1, and a capacitor C4 connected in parallel with the second switch T2, the corresponding capacitors are used to be charged by power supply Vcc when the corresponding detecting signal is low level. Furthermore, the trigger circuit 122 further includes a diode D11 connected between the second terminal of the first switch T1 and the first terminal of the third switch T3, and a diode D12 connected between the second terminal of the second switch T2 and the first terminal of the third switch T3.

The first switch T1, the second switch T2 and the third switch T3 are all configured to be turned on when the voltage at the first terminal is larger than the voltage at the third terminal. As to say, when the first detecting signal is pulse, the first switch T1 is turned on, specifically, the first switch T1 is turned on periodically. At this time, the circuit between the first terminal and the third terminal of the third switch T3 may be regarded as a short circuit, and the third switch T3 is turned off. Since the third switch T3 is turned off, the voltage at the first terminal of the control switch 121 is larger than the voltage at the third terminal, hence, the control switch 121 may be turned on.

When the first detecting signal is low level without a pulse signal, the first switch T1 is turned off, at this time, the power supply Vcc may charge the capacitor C3 connected to the first switch T1. When the capacitor C3 is charged to a preset value, the diode D11 is turned on. At this time, the voltage at the first terminal of the third switch T3 is larger than the voltage at the third terminal, the third switch T3 is turned on which will cause a short circuit between the first terminal and the third terminal of the control switch 121, and the control switch 121 is turned off.

Specifically, when the first detecting signal is periodic pulse, there will be at a low level for some time, and the capacitor C3 is charged. The control switch 121 may be kept in conductive state when the first detecting signal is periodic pulse (that is, the first end lamp base is in conductive state) by configuring the preset time for the capacitor C3 to be charged to turn on the diode D11 to be less than the duration of the low level of the periodic pulse.

Similarly, when the second detecting signal is high level or pulse, the second switch T2 is turned on, at this time, the circuit between the first terminal and the third terminal of the control switch 121 may be regarded as short circuit, the third switch T3 is turned off, and the control switch 121 is turned on.

When the second detecting signal is low level without a pulse signal, the second switch T2 is turned off, at this time, the power supply Vcc may charge the capacitor C4 connected to the second switch T2. When the capacitor C4 is charged to a preset value, the diode D12 is turned on. At this time, the voltage at the first terminal of the third switch T3 is larger than the voltage at the third terminal, the third switch T3 is turned on, and the control switch 121 is turned off.

Hence, when the first detecting signal and the second detecting signal are both high level or pulse, the first switch T1 and the second switch T2 are turned on, the third switch T3 is turned off, and the control switch 121 is turned on. When at least one of the first detecting signal and the second detecting signal is low level without a pulse signal, at least one of the first switch T1 and the second switch T2 is turned off, the third switch T3 is turned on, and the control switch 121 is turned off. Specifically, as long as one of the two detecting signals is low level, the control switch 121 is turned off and the at least one LED may not work, that is, as long as one end of the lamp base is not installed properly, the at least one LED may not work. Through this setting, not only the risk of leakage may be avoided, but also the circuit in the lamp tube may be protected.

In some embodiments, the driving module 113 further includes a delay circuit 123, the delay circuit 123 is configured to turn on the control switch 121 within a preset time after power-on. Specifically, the delay circuit 123 includes a capacitor connected between the first terminal and the third terminal of the control switch 121. Under normal circumstances, when the capacitor is charged for the preset time (for example, 0.2 s) or reaches a preset voltage, the control switch 121 is turned on, and the at least one LED 103 may work.

In some embodiments, when at least one of the first detecting signal and the second detecting signal is low level, the delay circuit 123 is reset. Such as, when the first detecting signal is low level, the third switch T3 is turned on, the circuit between two terminals of the capacitor 123 may be regarded as a short circuit, the capacitor 123 is discharged which may be regarded as resetting. When the first detecting signal and the second detecting signal are both high level, the third switch T3 is turned off, the capacitor 123 is charged, when the capacitor 123 is charged for the preset time (for example, 0.2 s) or reaches the preset voltage, the control switch 121 is turned on, and the at least one LED 103 may work. The control switch needs to be delayed again to be turned on, which may prevent the lamp base from arcing due to incorrect installation.

That is, under normal circumstances, after power-on, the at least one LED may work after the preset time. Under the circumstance that needs to detect the connection state of the lamp base, after power-on, the capacitor 123 will be charged. At this time, if it is detected that the first end lamp base and/or the second end lamp base may be not installed, the trigger module will generate a protection signal so that the capacitor 123 is discharged, which is regarded as resetting. When it is detected that the first end lamp base and the second end lamp base are installed, the capacitor 123 starts to charge, after reaching the preset time or voltage, the control switch 121 is turned on, and the at least one LED may work.

Although capacitors are used in the present disclosure to play the role of delay, those skilled in the art should understand that any other components may be used to play the role of delay or timing.

In some embodiments, the lighting assembly 100 further includes a rectifying module, the rectifying module includes a first rectifying circuit 104 connected between the at least one LED 103 and the first end lamp base 101, and a second rectifying circuit 105 connected between the at least one LED 103 and the second end lamp base 102, the first rectifying circuit 104 and the second rectifying circuit 105 are used to convert alternating current (AC) to direct current (DC) to provide to the at least one LED. Specifically, the first rectifying circuit 104 includes a rectifying bridge including diodes D21, D22, D23 and D24, and the second rectifying circuit 105 includes a rectifying bridge including diodes D31, D32, D33 and D34.

Figure 3:
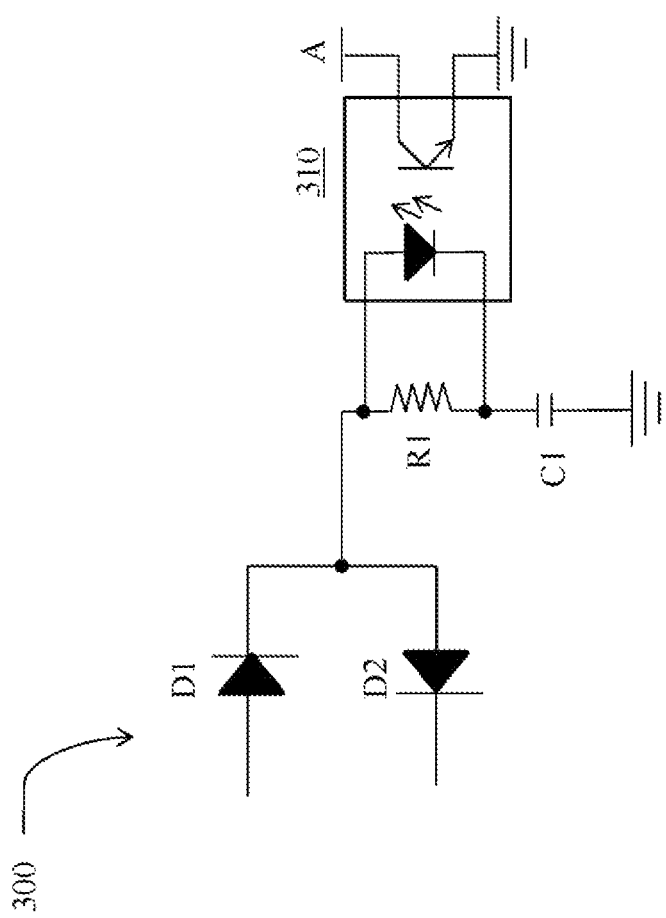
FIG. 3 is a schematic diagram of a detecting module according to the embodiments of the present disclosure.

FIG. 3 illustrates a schematic diagram of a detecting module 300 according to the embodiments of the present disclosure. As shown in FIG. 3, different from the first detecting module 211 shown in FIG. 2, in addition to diode D1, diode D2 and the first capacitor C1, the first detecting module 300 further includes a resistor R1 connected between a connection point and the first capacitor C1, and a optocoupler 310 connected to both terminals of the resistor R1, wherein the connection point is the point between the diode D1 and diode D2. Wherein the output of the optocoupler 310 is the first detecting signal, that is, the first detecting signal is taken before the first capacitor C1. The detecting module may detect whether there is AC signal through the resistor R1 to detect whether the corresponding first end lamp base is installed properly. When the first end lamp base is installed properly, there is AC signal through the resistor R1, and the corresponding first detecting signal is pulse or high level. When the first end lamp base is not installed properly, there is only DC signal through the resistor R1, and the corresponding first detecting signal is low level. Similarly, the second detecting module has the same or similar configuration or setting.

Figure 4:
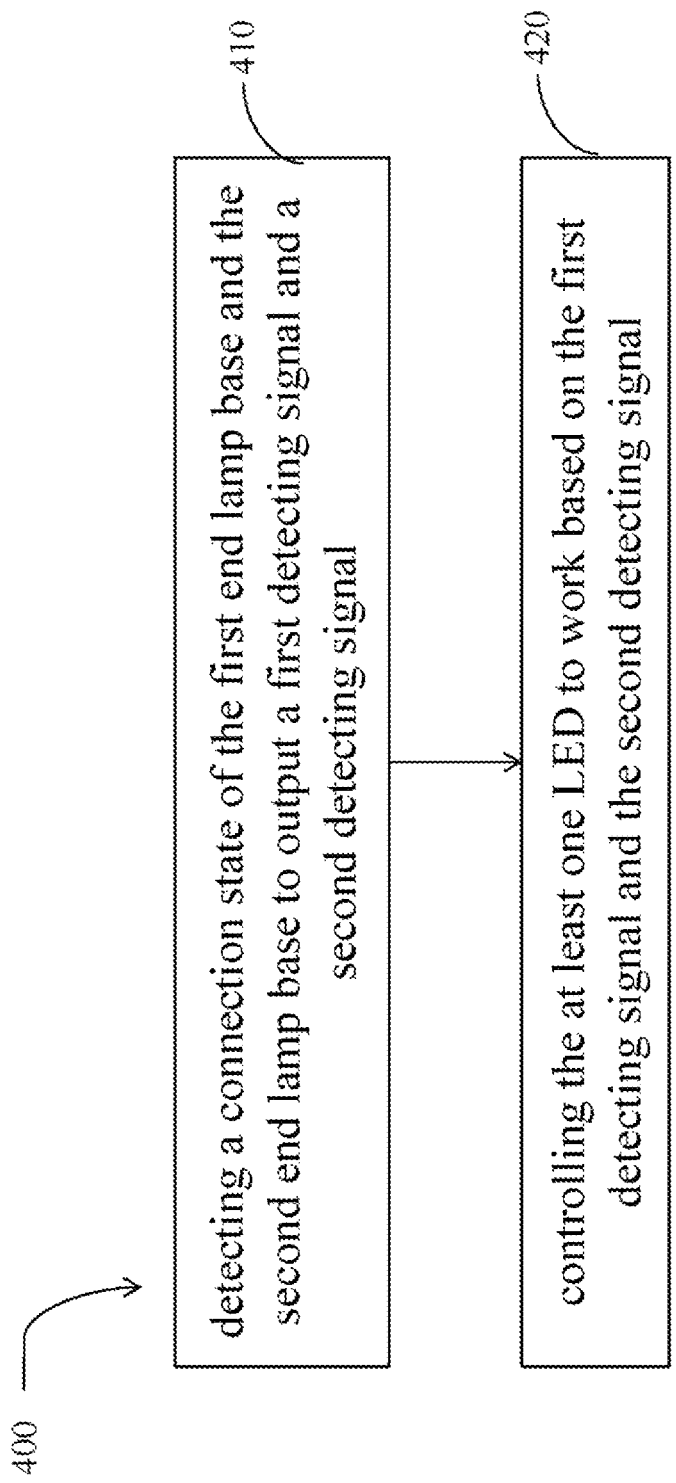
FIG. 4 is a flow diagram of a protective method of the lighting assembly according to the embodiments of the present disclosure.

FIG. 4 illustrates a flow diagram of a protective method of the lighting assembly according to the embodiments of the present disclosure. As shown in FIG. 4, the protective method includes step 410 and step 420.

In step 410, connection states of the first end lamp base and the second end lamp base are detected to output a first detecting signal and a second detecting signal.

Specifically, when the first end lamp base is in conductive state, there is AC signal through a first capacitor connected between the first pin and the second pin of the first end lamp base, and the first detecting signal is high level or pulse. When the first end lamp base is in disconnected state, there is no AC signal through the first capacitor, and the first detecting signal is low level. Similarly, when the second end lamp base is in conductive state, there is AC signal through a second capacitor connected between the third pin and the fourth pin of the second end lamp base, and the outputted second detecting signal is high level or pulse. When the second end lamp base is in disconnected state, there is no AC signal through the second capacitor, and the outputted second detecting signal is low level without pulse.

In step 420, the at least one LED is controlled to work based on the first detecting signal and the second detecting signal.

Specifically, when the first detecting signal and the second detecting signal are both high level or pulse, a control switch connected to at least one LED is turned on to control the at least one LED to work. When at least one of the first detecting signal and the second detecting signal is low level, the control switch is turned off to control the at least one LED not to work.

The protective device method of the lighting assembly of some embodiments of the present disclosure may easily detect whether the first end lamp base and the second end lamp base are installed properly and in conductive state by setting a detecting circuit. By setting a delay or timing circuit, as long as the first end lamp base and the second end lamp base are in conductive state, the detecting circuit will not send out the protection signal, and the circuit of the at least one LED will be turned on after the preset time of the delay circuit. Through the above settings, the lamp tube may be turned off when the lamp base is not installed properly, that is, on one hand, it is easy to protect the circuit inside the lamp tube and avoid arcing of the lamp base, on the other hand, it may also prevent the risk of electric leakage and electric shock.

While the present disclosure has been described in detail with reference to specific embodiments thereof, it will be understood by those skilled in the art that many modifications and variations may be made in the present disclosure. It is, therefore, to be understood that the appended claims are intended to cover all such modifications and variations insofar as they are within the true spirit and scope of the disclosure.

What is claimed is:

1. A protective device of a lighting assembly for preventing electric shock and preventing a lamp tube from working when the lamp tube is installed incorrectly, the lighting assembly comprising at least one LED, a first end lamp base and a second end lamp base, the first end lamp base comprises a first pin and a second pin, the second end lamp base comprises a third pin and a fourth pin, and the protective device comprising:
  a first detecting module and a second detecting module respectively configured to detect a connection state between the first pin and the second pin to output a first detecting signal, and a connection state between the third pin and the fourth pin to output a second detecting signal; and
  a driving module connected to the at least one LED and configured to control the at least one LED to work based on the first detecting signal and the second detecting signal,
  wherein the driving module comprises a control switch, and the control switch is turned on or turned off to control the at least one LED to work or not, the driving module further comprises a trigger circuit, the trigger circuit is connected to the control switch to control turning on or turning off the control switch based on a control signal generated by the first detecting signal and the second detecting signal, the trigger circuit comprises a first switch, a second switch and a third switch, a first terminal of the first switch is configured to receive the first detecting signal, a first terminal of the second switch is configured to receive the second detecting signal, a first terminal of the third switch is connected to a second terminal of the first switch and a second terminal of the second switch, and a second terminal of the third switch is connected to a driving terminal of the control switch.

2. The protective device of claim 1, wherein the first detecting module comprises a first capacitor connected with the first pin and the second pin to detect whether there is current signal through the first capacitor.

3. The protective device of claim 2, wherein in response to there being no current signal through the first capacitor, the first end lamp base is in disconnected state and the first detecting signal is low level, in response to there being current signal through the first capacitor, the first end lamp base is in conductive state and the first detecting signal is high level or pulse.

4. The protective device of claim 1, wherein the second detecting module comprises a second capacitor connected with the third pin and the fourth pin to detect whether there is current signal through the second capacitor.

5. The protective device of claim 4, wherein in response to there being no current signal through the second capacitor, the second end lamp base is in disconnected state and the second detecting signal is low level, in response to there being current signal through the second capacitor, the second end lamp base is in conductive state and the second detecting signal is high level or pulse.

6. The protective device of claim 1, wherein in response to the first detecting signal and the second detecting signal being both high levels or pulses, the control switch is turned on to control the at least one LED to work, and in response to at least one of the first detecting signal and the second detecting signal being low level, the control switch is turned off to control the at least one LED not to work.

7. The protective device of claim 1, wherein in response to the first detecting signal and the second detecting signal being both high levels or pulses, the first switch and the second switch are turned on, the third switch is turned off, and the control switch is turned on.

8. The protective device of claim 1, wherein in response to at least one of the first detecting signal and the second detecting signal being low level, at least one of the first switch and the second switch is turned off, the third switch is turned on, and the control switch is turned off.

9. The protective device of claim 1, wherein the driving module further comprises a delay circuit configured to turn on the control switch within a preset time after power-on.

10. The protective device of claim 9, wherein in response to at least one of the first detecting signal and the second detecting signal being low level, the delay circuit is reset.

11. A lighting assembly comprising a protective device, the lighting assembly comprising at least one LED, a first end lamp base and a second end lamp base, the first end lamp base comprises a first pin and a second pin, the second end lamp base comprises a third pin and a fourth pin, and the protective device comprising:
  a first detecting module and a second detecting module respectively configured to detect a connection state between the first pin and the second pin to output a first detecting signal, and a connection state between the third pin and the fourth pin to output a second detecting signal; and
  a driving module connected to the at least one LED and configured to control the at least one LED to work based on the first detecting signal and the second detecting signal,
  wherein the driving module comprises a control switch, and the control switch is turned on or turned off to control the at least one LED to work or not, the driving module further comprises a trigger circuit, the trigger circuit is connected to the control switch to control turning on or turning off the control switch based on a control signal generated by the first detecting signal and the second detecting signal, the trigger circuit comprises A first switch, a second switch and a third switch, a first terminal of the first switch is configured to receive the first detecting signal, a first terminal of the second switch is configured to receive the second detecting signal, a first terminal of the third switch is connected to a second terminal of the first switch and a second terminal of the second switch, and a second terminal of the third switch is connected to a driving terminal of the control switch.

12. A protective method of a lighting assembly by using the protective device of claim 1, the lighting assembly comprising at least one LED, a first end lamp base and a second end lamp base, the first end lamp base comprises a first pin and a second pin, the second end lamp base comprises a third pin and a fourth pin, and the protective device comprising:
   detecting a connection states between the first pin and the second pin to output a first detecting signal and detecting a connection state between the third pin and the fourth pin to output a second detecting signal; and
   controlling the at least one LED to work based on the first detecting signal and the second detecting signal.

\* \* \* \* \*